United States Patent

Lowe

[15] 3,700,955

[45] Oct. 24, 1972

[54] CATHODE RAY TUBE DISPLAY APPARATUS WITH EXTENDED TUBE LIFE

[72] Inventor: Peter R. Lowe, Denver, Colo.

[73] Assignee: Honeywell Inc., Minneapolis, Minn.

[22] Filed: Sept. 1, 1970

[21] Appl. No.: 68,626

[52] U.S. Cl. ....................315/20, 315/24, 346/110 R, 313/92 LF

[51] Int. Cl. ..............................................H01j 29/72

[58] Field of Search ........315/23, 20, 21, 24; 313/76, 313/92 PH, 92 LF; 346/110 R

[56] References Cited

UNITED STATES PATENTS

| | | | |
|---|---|---|---|
| 3,339,543 | 9/1967 | Richard | 346/110 R |
| 3,434,158 | 3/1969 | Stauffer et al. | 346/110 R |
| 3,441,668 | 4/1969 | Townsend | 315/31 R X |
| 2,292,979 | 8/1942 | Wald | 315/23 X |
| 2,728,027 | 12/1955 | Scull, Jr. | 315/23 X |

*Primary Examiner*—Benjamin R. Padgett
*Assistant Examiner*—E. E. Lehmann
*Attorney*—Arthur H. Swanson, George E. Bodenstein and Lockwood D. Burton

[57] ABSTRACT

The beam of a line scan fiber optics cathode ray tube is repeatedly swept along the phosphor element of the tube by a horizontal deflection coil to provide traces, representing the values of a plurality of data signals, which are recorded on a record sheet drawn continuously over the face of the fiber optics strip of the tube. A vertical shift deflection coil, energized by the triangular wave output signal of a shift deflection generator, slowly and continuously shifts the path, along which the beam sweeps on the phosphor, up and down between the boundaries of the area of the phosphor which is coextensive with the active area of the fiber optics strip.

3 Claims, 2 Drawing Figures

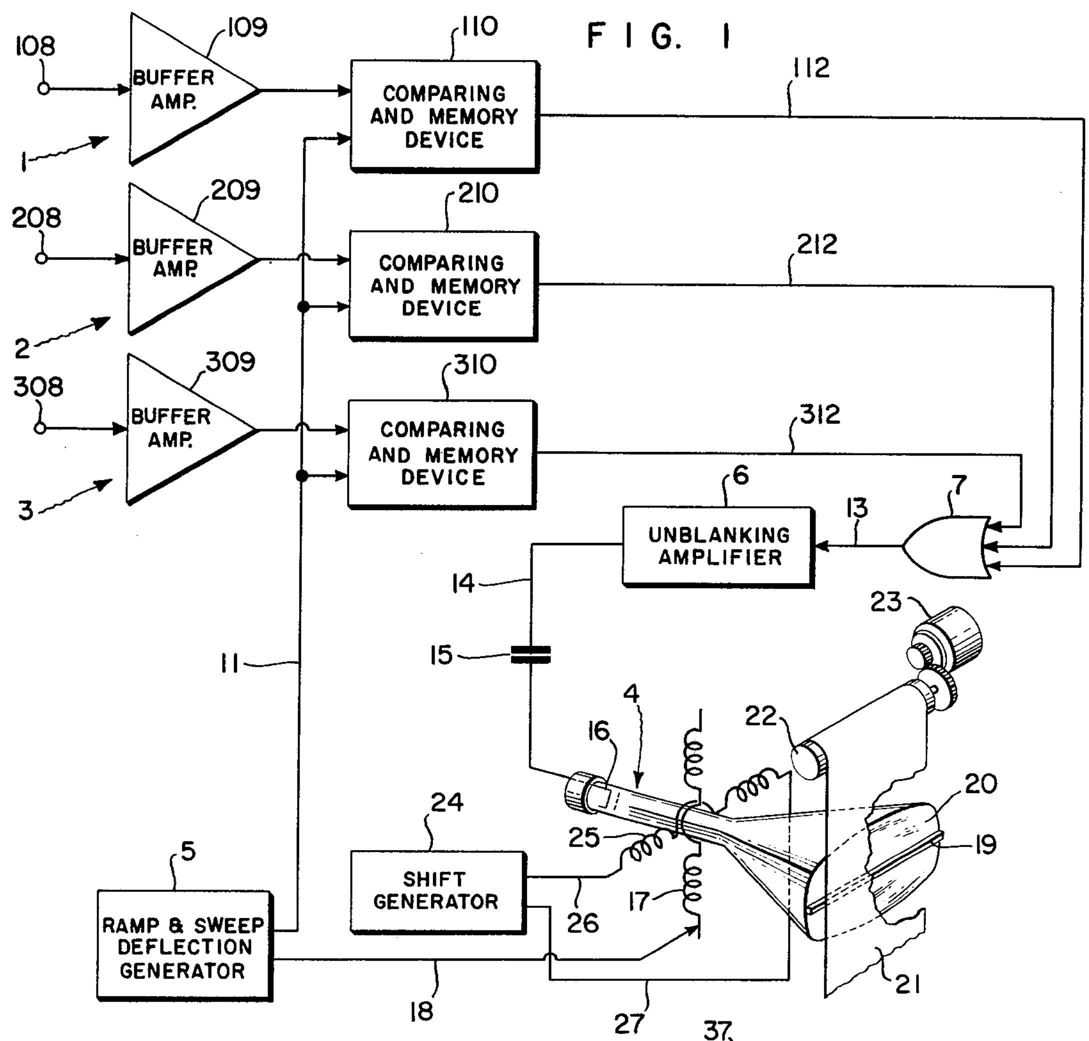
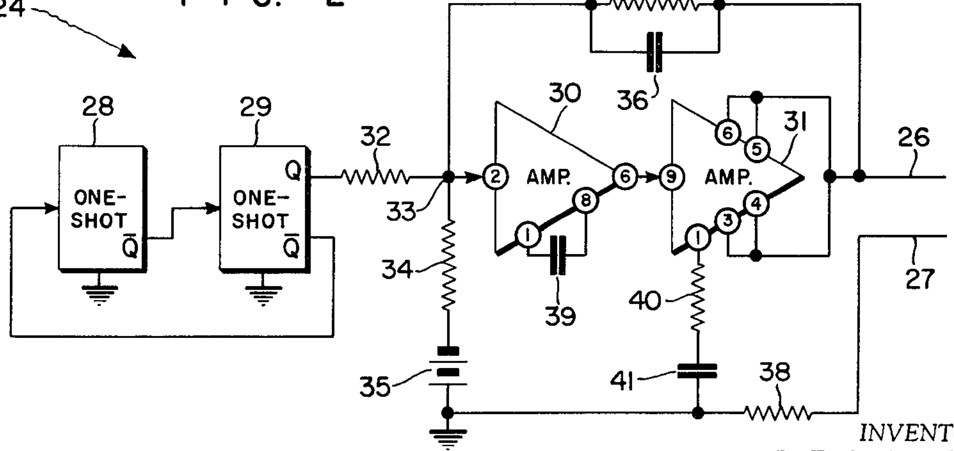
INVENTOR.
PETER R. LOWE
BY
AGENT.

CATHODE RAY TUBE DISPLAY APPARATUS WITH EXTENDED TUBE LIFE

CROSS-REFERENCES TO RELATED APPLICATIONS

Subject matter disclosed but not claimed herein is disclosed and claimed in the copending United States patent application of Tyler and Lowe, Ser. No. 1,427, filed on Jan. 8, 1970.

BACKGROUND OF THE INVENTION

The present invention relates generally to graphic display apparatus, i.e., graphic indicating and/or recording apparatus, of the type which employs the beam of a cathode ray tube as the display marking means. Specifically, the invention relates to apparatus of this type which employs so-called line scanning or line scan indicating and/or recording, wherein the cathode ray beam is selectively produced and is repeatedly swept or scanned over a single straight line or path on the strip-like or band-like phosphor element or coating of the line scan cathode ray tube of such apparatus to provide the indicated and/or recorded traces or curves. An example of a recording form of such apparatus is that which is disclosed and claimed in said copending application.

It is known that the phosphor material or phosphors which make up the phosphor elements which are employed in the line scan types of cathode ray tubes which are utilized in apparatus of the foregoing type are subject to an undesirable phenomenon or characteristic, referred to herein as phosphor life. This characteristic manifests itself as a progressive, permanent reduction in phosphor efficiency or effectiveness along the repetitively scanned line of the phosphor, which reduction continues until the phosphor is permanently rendered useless for practical purposes. I have found that such phosphors also exhibit a second undesirable phenomenon, referred to herein as phosphor fatigue, which manifests itself as a relatively small, but nevertheless significant, reduction in phosphor efficiency along the scanned line after a long period of scanning. This decrease in phosphor efficiency is over and above that which is attributable to phosphor life.

In all of the forms of apparatus of the foregoing type of which I am aware, the two phenomena described above cause the phosphor of the apparatus, and hence the tubes including this phosphor, to have an undesirably short useful life, due to the fact that the scanning is performed over and over along the same path on the phosphor. That is, the nature of such apparatus, and the resulting demands which are imposed on the phosphor thereof, including the continued repeated passage of the high intensity cathode ray beam of such apparatus over but a single line of the phosphor, cause such apparatus to have a disadvantageously short useful life before tube replacement is required, due to the effects of both phosphor fatigue and phosphor life. It is significant to note in this connection that the specific type of phosphor (P-16) which it has been found desirable to employ in apparatus of the type disclosed in said copending application is subject to the disadvantageous results of both phosphor fatigue and phosphor life.

SUMMARY OF THE INVENTION

Accordingly, it is an object of the present invention to provide improved apparatus of the foregoing type wherein the effects of phosphor fatigue and phosphor life are minimized, to the end that the useful life of the apparatus, i.e., the period of satisfactory operation obtained before replacement of the cathode ray tube becomes necessary in order to maintain acceptable performance, is significantly lengthened and maximized, in comparison to the useful life of the previously known forms of such apparatus. More specifically, it is an object of the invention to provide such improved apparatus wherein the useful life of the phosphor, i.e., the number of hours over which the phosphor operates with an efficiency which is above a predetermined value, is significantly lengthened or prolonged and maximized with respect to the useful life of the phosphor in said previously known apparatus forms. An even more specific object of the invention is to provide such improved apparatus wherein this lengthening or prolongation of the useful life of the phosphor and of the apparatus is effected and obtained without requiring any change in the standard cathode ray tube or the phosphor thereof, and without requiring any reduction in the intensity of the cathode ray beam, any periodic rest periods for the apparatus, or any other significant compromises or restrictions with respect to the nature or quality of the indications and/or records produced by the apparatus.

In accordance with the present invention, the foregoing and other desirable objects are accomplished by the use of a discovery which I have made. Specifically, I have found that the effects of phosphor fatigue will be kept to a minimum for the phosphor of apparatus of the foregoing type, and that such phosphor will be caused to operate with a significantly higher efficiency for a significantly longer time before requiring replacement, if the line or path along which the beam of the apparatus sweeps or scans over the phosphor is continuously and progressively moved or shifted over the entire useable area of the phosphor, substantially at right angles or transversely to the direction of sweep, at a suitable rate. I have found also in this connection that even though a line of phosphor may exhibit or tend to exhibit a decrease in efficiency, due to phosphor fatigue, after being subjected to repeated scanning, such a line will recover and return to full efficiency if the scanning of this line is appropriately suspended, as it is by the above-described line shifting, and the phosphor of this line is allowed to rest, for a suitable period.

The rate at which the above-described shifting of the beam-produced line or path on the phosphor is effected is desirably made to be sufficiently fast that the effects of phosphor fatigue are minimized, but at the same time must be sufficiently slow that the produced indications and/or records are not adversely or unacceptably or unduely distorted. Thus, this rate of shifting is desirably made to be that which gives an optimum useful phosphor life without producing an unacceptable degree of distortion of the indicated and/or recorded traces. This rate will therefore usually be a very small fraction of the scan or sweep rate at which the beam is swept along its path, and will thus be relatively slow.

In summary, I have found that, by slowly and continuously transversely shifting, in the foregoing manner, the line or path along which the beam moves over the phosphor in apparatus of the foregoing type, the useful life of this phosphor and of the apparatus including it is significantly prolonged without imposing any significant restrictions on the apparatus, its operation, or the indications and/or records which it produces. Moreover, such shifting is entirely feasible, since the available useful phosphor area in conventional line scan cathode ray tubes is regularly many times wider than the line or trace produced on the phosphor by the tube beam.

In accordance with the foregoing, apparatus according to the present invention includes means for slowly, continuously, and progressively moving or shifting the line or path, along which the cathode ray beam sweeps or scans, over, and within the boundaries of, the entire useable or useful phosphor area of the cathode ray tube. This shifting is done in a direction which is substantially at right angles to the length of the sweep path, and at a rate which, as explained above, causes the phosphor to have a useful life which is prolonged as much as possible consistant with keeping the distortion of the produced indications and/or records below a predetermined value.

The means for so shifting the beam path over the entire useful phosphor area of the tube may include a deflecting means, such as a deflecting coil, which is so oriented as to deflect the tube beam in a direction which is substantially at right angles to the direction in which the beam is deflected for the scanning operation. Such deflecting means may be driven by a suitable signal, such as a triangular wave signal, produced by a signal generating means designed to operate at a suitable frequency. As a result of this continuous, slow transverse shifting of the beam path, fresh, rested and restored phosphor is continuously brought into use as scanning proceeds, with the result that the available phosphor provides a significantly increased number of hours of operation during which its operating efficiency remains acceptable. This prolonged useful life of the phosphor results not only from the fact that all of the available useable phosphor material is utilized, but results in part from the fact that the beam path shifting also minimizes any efficiency decreases, due to phosphor fatigue, by continuously suspending the excitation of portions of the phosphor which have been repeatedly scanned, and thus allowing this phosphor to rest and to recover from the effects of the previous scanning before again being excited during subsequent scanning.

BRIEF DESCRIPTION OF THE DRAWING

A better understanding of the present invention may be had from the following detailed description when read in connection with the accompanying drawing, wherein FIG. 1 is a diagram of line scan cathode ray tube recording apparatus embodying the present invention; and FIG. 2 is a diagram of apparatus which is useful as the shift generator of the FIG. 1 apparatus.

DESCRIPTION OF THE PREFERRED EMBODIMENT

THE APPARATUS OF FIG. 1

The apparatus illustrated in FIG. 1 as a preferred example of apparatus embodying the present invention is basically of the type which is disclosed in said copending application. Thus, the FIG. 1 apparatus is multichannel line scan recording apparatus which is arranged to produce an analog display in the form of a record of three traces or curves of signal value vs. time, each curve representing the value of a respective one of three data signals. These curves are produced by a cathode ray tube beam operating as a marking means on the phosphor of a line scan fiber optics cathode ray tube to provide line scan recording on a photosensitive record sheet which is continuously moved over the fiber optics strip of the tube.

In accordance with the present invention, the FIG. 1 apparatus also includes shift deflection means for slowly and continuously shifting the line, along which the cathode ray beam sweeps or scans, over the entire useable area of the tube phosphor. This usable area of the phosphor is the band-like area which is coextensive with the active area of the fiber optics strip of the tube. Such continuous transverse shifting of the beam sweep path provides a significant increase in the useful life of the phosphor, and hence of the tube and of the entire apparatus, as has been explained previously herein.

Consonant with the foregoing, the FIG. 1 apparatus includes data signal channels or circuit portions 1, 2, and 3, a line scan fiber optics cathode ray tube 4, a ramp and sweep deflection signal generator 5 having ramp signal and sweep deflection signal outputs, an unblanking amplifier 6, and a master OR gate 7 having three inputs. The data channel 1 includes an input connection 108, a buffer amplifier 109, and a comparing and memory device 110. The connection 108, which is intended for connection to the source of the first of the three signals to be recorded, is connected to the input of the amplifier 109. The output of the latter is connected to one of the two inputs of the device 110, the remaining input of which is connected to the ramp signal output of the generator 5 by way of a ramp signal connection 11. The output of the device 110 is connected by a connection 112 to one of the three inputs of the master OR gate 7. The device 110 is considered herein to include a comparator and memory means which are the equivalents, respectively, of the comparators and any of the several forms of memory arrangements included in the apparatus of said copending application.

The data channel 2 is identical to the channel 1 as just described, and includes an input connection 208, a buffer amplifier 209, and a comparing and memory device 210. Also, the data channel 3 is identical to the channels 1 and 2, and includes an input connection 308, a buffer amplifier 309, and a comparing and memory device 310. The interconnections between the elements of each of the channels 2 and 3 are the same as those for the channel 1, as can be seen from FIG. 1. The connections 208 and 308 are intended for connection to the respective sources of the second and third of the three data signals to be recorded.

The output of the OR gate 7, which receives the outputs of the channels 1, 2, and 3, is connected by a connection 13 to the input of the unblanking amplifier 6, while the output of the latter is connected by a connection 14 and a d.c. blocking capacitor 15 to the cathode 16 of the tube 4.

Associated with the tube 4 is a scan or sweep, horizontal deflection coil 17. This coil is connected to the sweep deflection signal output of the generator 5 by a connection 18. The tube 4 is of the known type, having a gun including the cathode 16 by which the cathode ray beam of the tube is produced and controlled in intensity. The tube 4 also has the usual fiber optics array or strip 19 inserted into a faceplate 20, and the usual phosphor element, not shown, consisting of a strip-like or band-like coating of phosphor material coated onto the inner surface of the faceplate 20 at least coextensively with the active or usable inboard area of the strip 19. A photosensitive record sheet 21 is advanced at a desired rate, downwardly in FIG. 1, over the strip 19 from a supply roll 22 by means of a suitable motor 23.

The foregoing description covers the construction and arrangement of that portion of the FIG. 1 apparatus which is the same as any of the several apparatus forms disclosed in said copending application. With respect to the operation of this known portion of the FIG. 1 apparatus, it is noted that the generator 5 produces two synchronized output signals. One of these signals is a cathode ray tube sweep deflection signal of the usual ramp or saw-tooth type. This signal is applied to the sweep deflection coil 17 over the connection 18, and causes the beam of the tube 4 alternately to sweep and fly back in a straight line across the tube phosphor repeatedly, as will be described in more detail hereinafter. The second of said two generator signals is a ramp voltage signal, the value of which is repeatedly swept between predetermined minimum and maximum values in synchronism with said sweeping of the beam across the phosphor of the tube 4. This ramp signal is applied to the devices 110, 210, and 310 over the connection 11 as a comparison signal, and enables the apparatus to produce its records representing the values of the three data signals, as will be explained more fully hereinafter.

The tube 4 is constructed and arranged, in the usual manner, so that, when the tube beam is produced and is swept or scanned across the tube phosphor under the action of the aforementioned sweep deflection signal, the resulting activation of the phosphor along the scanned line or path thereon successively illuminates the inboard ends of the fiber optics elements which make up the strip 19. However, the amplifier 6 normally maintains the tube 4 blanked, and the beam deactivated or off, whereby there is normally no illumination of the strip 19.

Whenever a signal is present on the connection 13 to the amplifier 6, however, the latter unblanks the tube 4 and turns on the beam of the tube via the connection 14 and the cathode 16. As long as the beam is so activated, it effectively produces or marks a line on and across the sheet 21. This line will be drawn along that transverse element of the sheet 21 which is then in register with the path of the beam on the phosphor behind the strip 19, and will extend from the point along the sweep path at which the tube 4 becomes unblanked to the point along the sweep path at which the signal to the amplifier 6 on the connection 13 disappears and the tube 4 becomes blanked once more. Due to the downward motion of the sheet 21 over the strip 19, each of said lines will, obviously, be somewhat slanted on the sheet, and successive lines will be displaced along the length of the sheet by distances determined jointly by the sweep frequency and the speed of the movement of the sheet.

For any one of the three data signals of the respective channels 1, 2, and 3, the tube 4 is unblanked in each sweep by the above-described action of the amplifier 6, and marks the sheet 21, as long as, but only as long as, the value of the comparison signal, as applied to the devices 110, 210, and 310 over the connection 11, lies between the present value of that data signal in that sweep and the previous value which that data signal had during the immediately previous sweep. Specifically, in each sweep, the tube 4 is unblanked by the arrival of the comparison signal at whichever of these previous and present data signal values occurs earliest in that sweep, and is blanked again by the arrival of the ramp signal at the other of said previous and present values. As a result, for each sweep, the beam of the tube 4 marks the sheet 21 to produce a line extending between two points, the positions of which represent, respectively, said previous and present values of that data signal. These successively produced lines together form a curve on the sheet 21 representing the value of that data signal as this value varies with time. During each sweep, similar lines are produced on the sheet 21 for each of the other data signals, which lines form respective curves on the sheet 21 for these other data signals also.

It is believed that the foregoing explanation adequately describes, for the present purposes, the construction and operation of that portion of the FIG. 1 apparatus which corresponds to the apparatus disclosed in said copending application. A more detailed description of such apparatus will, however, be found in said copending application.

In accordance with the present invention, the FIG. 1 apparatus also includes, as the shift deflection means previously referred to herein, a shift deflection signal generator 24 and a shift deflection coil 25. The generator 24 supplies a shift deflection signal to the coil 25 by way of output connections 26 and 27. The coil 25 is associated with the tube 4 in such a manner that when this coil is energized by the shift signal from the generator 24, the coil deflects the tube beam substantially at right angles to the direction of scanning, i.e., to the length of the sweep path, the length of the strip 19, and the length of the above-described band-like phosphor element which lies coexstensively with the inboard area of the strip 19. The extent of this deflection, which is in the vertical direction in the FIG. 1 apparatus, is dependent upon the value of the shift signal from the generator 24, and the rate at which this deflection is produced is dependent upon the rate at which this shift signal value changes.

The purpose of the shift deflection generator 24 and coil 25, and the vertical beam deflection which they produce, is to provide the previously-described slow, continuous, progressive transverse shifting of the line, along which the beam of the tube 4 sweeps, over the entire usable area of the phosphor element. Accordingly, the generator 24 is so arranged that its output signal on the connections 26 and 27 causes the tube beam to be deflected up and down continuously at the required slow rate, through such an angle that the line or path over which the beam sweeps on the phosphor is continuously moved or shifted up and down between the boundaries of the useful area of the phosphor.

As noted hereinbefore, the rate at which the beam and its path are so shifted may well be the most rapid rate possible which will not cause undue distortion of the recorded traces. With specific reference to the FIG. 1 apparatus, this rate of beam shifting may desirably be just below that at which an unacceptable degree of distortion of the curves produced on the sheet 21 would occur for the lowest rate of feed of the sheet 21 employed. By way of illustration and example, it is noted that, in an operating apparatus embodying the present invention and employing a scanning rate of 20 kilohertz and paper speeds as low as one-tenth centimeter per second, a beam shifting rate of thirty minutes per shift cycle (shift from one boundary of the usable phosphor area to the other boundary and return) yielded a significantly extended useful life of the phosphor without producing any undue distortion of the recorded curves.

The above-described continuous vertical shifting of the line along which the scanning takes place is both feasible and advantageous because, as noted hereinbefore, the width of the useful phosphor area of tubes such as the tube 4 is regularly many times greater than the width of said line or trace as produced on the phosphor by the tube beam. This is so because, in tubes such as the tube 4, the width of the active area of the fiber optics strip is regularly many times greater than said line or trace width, and because this width of the fiber optics strip is the width of the usable area of the phosphor between the aforementioned boundaries. For example, the width of the usable phosphor area may well be forty times the width of the trace in a typical conventional fiber optics tube.

The output signal of the generator 24 may have various forms, just as long as this signal produces the above-described continuous shifting of the tube beam path up and down between the boundaries of the useful phosphor area at the desired rate. One desirable form of signal for this use is a triangular wave signal of a frequency corresponding to the desired rate of shifting. An illustrative circuit for the generator 24 which is well adapted for providing such a triangular wave signal is shown in FIG. 2, to be described hereinafter. It should be understood, however, that the generator 24 may have any form which provides a signal capable of effecting the desired beam shifting.

Although the beam path shifting means of the present invention has been illustrated herein as being employed and useful in apparatus of the type disclosed in said copending application, which apparatus produces each of its curves in the form of a series of lines, it should be understood that the invention is equally applicable to line scan apparatus which produces its indications and/or records in the form of dots or other marks. In fact the invention is equally applicable to any apparatus wherein, in the absence of the invention, the beam of a cathode ray tube would disadvantageously be continuously swept over the same path on a phosphor element, and wherein this element is considerably wider, in the direction transverse to the direction of sweep, than the width of the swept path, and therefore would permit, and be benefitted by, the continuous transverse shifting of said path over an area of the element. It should be understood further that the invention is applicable not only to apparatus wherein the cathode ray beam is deflected electromagnetically, but is equally applicable to apparatus wherein the cathode ray beam is deflected by electrostatic or other means.

THE APPARATUS OF FIG. 2

There is illustrated in FIG. 2 the circuit for a typical apparatus which readily produces a very low frequency triangular wave signal, and which is, therefore, useful as the circuit for the shift generator 24 of the FIG. 1 apparatus. The FIG. 2 circuit includes first and second monostable delay multivibrators or one-shots 28 and 29, respectively, first and second amplifiers 30 and 31, respectively, and various additional components interconnecting these devices. In this circuit, the Q output of the one-shot 28 is connected to the input of the one-shot 29, while the Q output of the latter is connected to the input of the one-shot 28. As a result, there appears at the Q output the one-shot 29 a square wave signal having a frequency dependent upon the component values of the one-shots. By the proper selection of these values, this frequency can be made to be that at which it is desired to have the beam shifting take place in the FIG. 1 apparatus. By way of illustration and example, it is noted that each of the one-shots 28 and 29 may well be a Motorola type MC851G one-shot.

The remainder of the FIG. 2 apparatus serves to convert the above-noted square wave signal into a triangular wave signal suitable for driving the shift deflection coil 25 of the FIG. 1 apparatus. To this end, the Q output of the one-shot 29 is connected by a resistor 32 to a junction 33, to which is also connected the input of the amplifier 30. The junction 33 is biased negatively with respect to circuit common by being connected thereto through a resistor 34 and a source of bias voltage, shown as a battery 35, connected in series.

The output of the amplifier 30 is connected to the input of the amplifier 31, the output of which is connected to the generator or shift signal output connection 26. The output of the amplifier 31 is also connected through an integrating capacitor 36 to the junction 33. A bias resistor 37 is connected in parallel with the capacitor 36. The remaining generator output connection 27 is connected to circuit common through a resistor 38, the value of which establishes the mean value for the shift signal current which the FIG. 2 circuit would send through the coil 25.

The amplifier 30 is an inverting, high input impedance, high gain operational amplifier, and may well be of the integrated circuit type. A typical commercially available form of such an amplifier is the National Semiconductor Corp. type LM308 amplifier, and for purposes of illustration and example it is considered herein that the amplifier 30 is this particular amplifier. When this particular amplifier is used as the amplifier 30, the input and output are at amplifier terminals 2 and 6, respectively, and it is desirable to connect a frequency compensating capacitor 39 between the amplifier terminals 1 and 8, all as shown in FIG. 2.

The amplifier 31 is a non-inverting power amplifier of unity gain, and may well be an integrated amplifier such as the Motorola type MC1538R amplifier. For purposes of illustration and example, it is considered herein that the amplifier 31 is this particular amplifier. When this particular amplifier is used as the amplifier 31, the input is at amplifier terminal 9, and the output is at amplifier terminals 3, 4, 5, and 6, connected together. Also, it is desirable to connect a frequency compensating resistor 40 and capacitor 41 in series between the amplifier terminal 1 and circuit common, all as shown in FIG. 2.

The amplifiers 30 and 31 and the feedback connection including the capacitor 36 and the resistor 37 form an integrating amplifier configuration which integrates the square wave output signal from the one-shot 29 to produce between the connections 26 and 27 a triangular wave signal suitable for energizing the coil 25. The resistor 37 serves to maintain the mean d.c. level of this signal, and the value of this resistor is desirably made to be sufficiently high to prevent distortion of the triangular waveform of this signal.

Although the FIG. 2 apparatus as just described employs separate amplifiers 30 and 31, it should be understood that a suitable single integrating amplifier may, if desired, be used in place of such separate amplifiers. Also, if desired, signal generating means other than the one-shots 28 and 29 may be employed to provide the square wave signal input to the amplifier.

In summary, it is seen that the described apparatus according to the present invention fulfills the objects set forth hereinbefore by including means to shift continuously the beam of a conventional line scan cathode ray tube transversely with respect to the direction of scan so as to cause the beam path on the associated tube phosphor element to shift continuously over all of the usable area of this phosphor, thereby to make optimum use of all of the latter, at a rate which yields an optimum phosphor operating efficiency for an optimum time period, without introducing unacceptable distortion into the indications and/or records produced by the apparatus.

The embodiments of the invention in which an exclusive property or privilege is claimed are defined as follows:

1. Recording apparatus including a cathode ray tube having a face plate, a band of phosphor material coated on said plate having a length extending across said plate and a width, at right angles to said length, which is a fraction of said length, and means for selectively producing a cathode ray beam and for causing said beam to impinge on said band, means for maintaining a light-sensitive recording medium in contact with said plate and for moving said medium across said plate in a direction at right angles to the length of said band, means for repeatedly sweeping said beam along said band in a straight line path in the direction of the length of said band to produce corresponding recorded traces on said medium across the direction of movement thereof, the width of said path being considerably less than the width of said band, means for producing a signal which progressively increases and decreases in value at a frequency which is a very small fraction of the frequency with which said beam is swept along said path, and means for shifting said beam in response to said signal in a direction at right angles to the direction of said path to shift said path continuously and progressively back and forth over the area of said band, at right angles to the direction of the length of said band and between the longitudinal boundaries of said band, at a rate which is a very small fraction of the rate at which said beam is swept along said path and which causes said beam, in each of said sweeps, to impinge on at least a portion of said phosphor material which was not impinged on by said beam during the immediately previous one of said sweeps.

2. Apparatus as specified in claim 1, wherein a fiber optics strip is mounted in association with said plate, said strip having a useable area lying within said area of said band and having a length extending in the direction of the length of said path.

3. Apparatus as specified in claim 1, wherein the rate of said shifting of said path over said band is such as to prevent said beam from making a repeat sweep over a given path on said band until at least a portion of said material lying in the last-mentioned path has at least partially recovered from the effects of the previous traversals of said beam along said last-mentioned path.

* * * * *